United States Patent
Raz et al.

[19]

[11] Patent Number: 6,049,421
[45] Date of Patent: Apr. 11, 2000

[54] AUTOMATED SCANNING OF MICROSCOPE SLIDES

[75] Inventors: Ryan S. Raz; Uri Frodis; Duncan A. Newman, all of Toronto, Canada

[73] Assignee: Morphometrix Technologies Inc., Toronto, Canada

[21] Appl. No.: 09/009,269

[22] Filed: Jan. 20, 1998

Related U.S. Application Data

[63] Continuation-in-part of application No. PCT/CA96/00475, Jul. 18, 1996
[60] Provisional application No. 60/001,220, Jul. 19, 1995, and provisional application No. 60/001,217, Jul. 19, 1995.

[51] Int. Cl.[7] ................................................ G02B 21/26
[52] U.S. Cl. ........................ 359/394; 359/368; 356/244
[58] Field of Search ................................... 359/368, 391, 359/392, 393, 394; 356/244; 414/224, 225

[56] References Cited

U.S. PATENT DOCUMENTS

| | | | |
|---|---|---|---|
| 4,589,741 | 5/1986 | Clegg | 359/394 |
| 4,674,875 | 6/1987 | Koizumi | 356/237.2 |
| 4,818,169 | 4/1989 | Schram et al. | 414/331 |
| 4,832,474 | 5/1989 | Yoshinaga et al. | 359/394 |
| 5,367,401 | 11/1994 | Saulietis | 359/398 |
| 5,386,318 | 1/1995 | Kuhnert et al. | 359/394 |
| 5,446,584 | 8/1995 | Bacchi et al. | 359/393 |
| 5,473,706 | 12/1995 | Bacus et al. | 382/133 |

FOREIGN PATENT DOCUMENTS

WO 97/04347  2/1997  Canada.

*Primary Examiner*—Cassandra Spyrou
*Assistant Examiner*—Mark A. Robinson
*Attorney, Agent, or Firm*—Ridout & Maybee

[57] ABSTRACT

A system is provided for the automated imaging of a succession of microscope slides (S). The slides are mounted in carriers and loaded into cassettes. Slide carriers from a first cassette in a slide loader (2) are ejected from the cassette into a loading station and thence moved by an actuator onto a stage beneath a microscope objective (6) which images a sub-area of a circular sample area on the slide onto an imaging sensor (10) whence images are digitized and stored. The stage (4) is conjointly rotated by a motor (22) as a carrier (24) for the stage is moved linearly, so as to execute a spiral scan of sub-areas of the sample area which sub-areas are successively imaged using a strobe lamp (12) to illuminate the sample area at intervals during the scan determined by signals from an encoder (25). A preliminary scan, which may be in an opposite direction along the spiral, may be used to obtain, for a focus actuator (18), focusing data used during the scan. As a following slide carrier is loaded onto the stage for scanning, the previous slide carrier is ejected into a chute from which an actuator inserts it into a further cassette in the same orientation in which it left the first cassette.

24 Claims, 9 Drawing Sheets

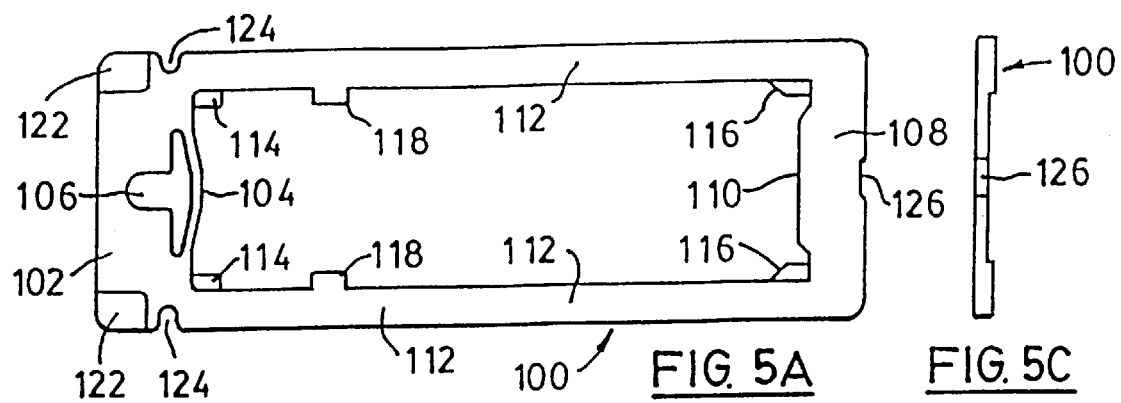
FIG. 5A
FIG. 5C
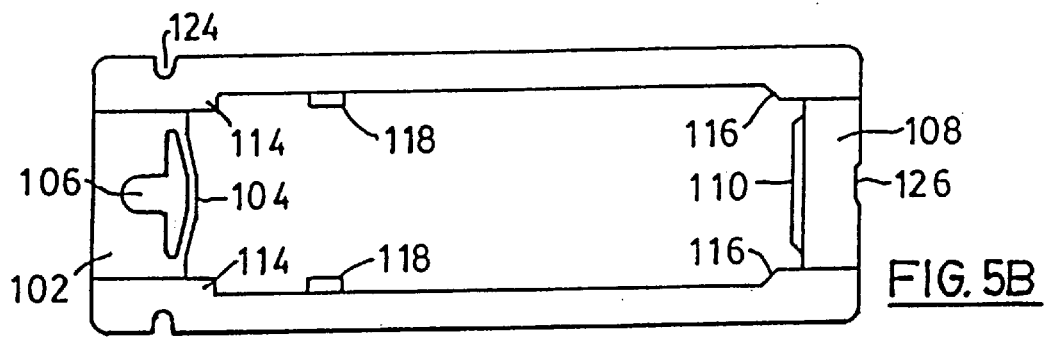
FIG. 5B 6,049,421

AUTOMATED SCANNING OF MICROSCOPE SLIDES

This application claims the benefit of U.S. Provisional Applications 60/001,220 filed Jul. 19 1995 and 60/001,217 filed Jul. 19, 1995, and PCT International Application PCT/CA96/00475 filed Jul. 18, 1996.

This invention relates to the automated scanning of microscope slides in order to generate data suitable for automated screening or prescreening of samples for the identification of anomalies or particular features of interest, for example in the automated processing of "pap" smears, although the invention is capable of much wider application wherever multiple samples are to be examined.

Typically, known systems for the scanning of microscope slides provide a microscope stage with means for moving the slide relative to a microscope objective on two orthogonal (X and Y) axes (to provide precise positioning and/or a raster scan), and possibly also on a third orthogonal (Z) axis to provide automatic focusing. An example of such a system is disclosed in U.S. Pat. No. 5,367,401 (Saulietz). Such systems, as for example the Saulietz patent, may also be equipped with rotary stages to facilitate the positioning of successive slides or the positioning of slides in successive positions.

Additionally, means are necessary for conveying a succession of slides to the microscope stage and removing and storing them after scanning. Such systems are disclosed in U.S. Pat. Nos. 4,159,875 (Hauser), 4,248,498 (Georges), and 4,501,495 (Faulkner).

In an automated system, it is also necessary to provide means for releasable securing slides in a definite relationship to the stage during examination. For this purpose, vacuum chucks have been proposed, as for example in U.S. Pat. Nos. 4,508,435 (Graham et al) and 4,981,345 (Berry et al). While such chucks can accommodate X and Y motion of the stage by use of flexible vacuum connections, they do not accommodate rotary motion.

When examining a sample, particularly a circular or disk-like sample, or generally circular area on a slide, such as are produced by some increasingly utilized [of] slide preparation techniques, there can be advantages in performing a continuous spiral scan of an area of interest of the sample. Thus U.S. Pat. No. 4,674,875 (Koizumi) and IBM technical Disclosure Bulletin, February 1986, Vol. 28, No. 9, both disclose a system for scanning the surface of a disk for defects using a spiral path, although not in conjunction with a conventional microscope, while U.S. Pat. No. 4,589,741 (Clegg) discloses a manually operated microscope stage in which a sample is moved so that the point of focus of a microscope objective follows a spiral path over the surface of the slide. The spiral motion is provided by a single operating knob, and in conjunction with a position counter, enables any point on the slide to be accessed and identified by manipulating a single knob and reading a single counter.

It is an object of the present invention to provide an automated scanning system for a microscope which simplifies scanning on a stage of a generally circular area of a slide or sample while enabling provision of facilities such as the automated advance of slides to the stage and their subsequent release, illumination of the slides from beneath the stage, and simplified handling of slides through the system.

Accordingly, the invention provides an automated slide scanning system as set forth in the appended claims, and set forth in more detail with reference to the following description of a preferred embodiment thereof.

SHORT DESCRIPTION OF THE DRAWINGS

FIG. 5A, 5B and 5C are top plan, bottom plan and end views of a slide holder;

Figure 1:
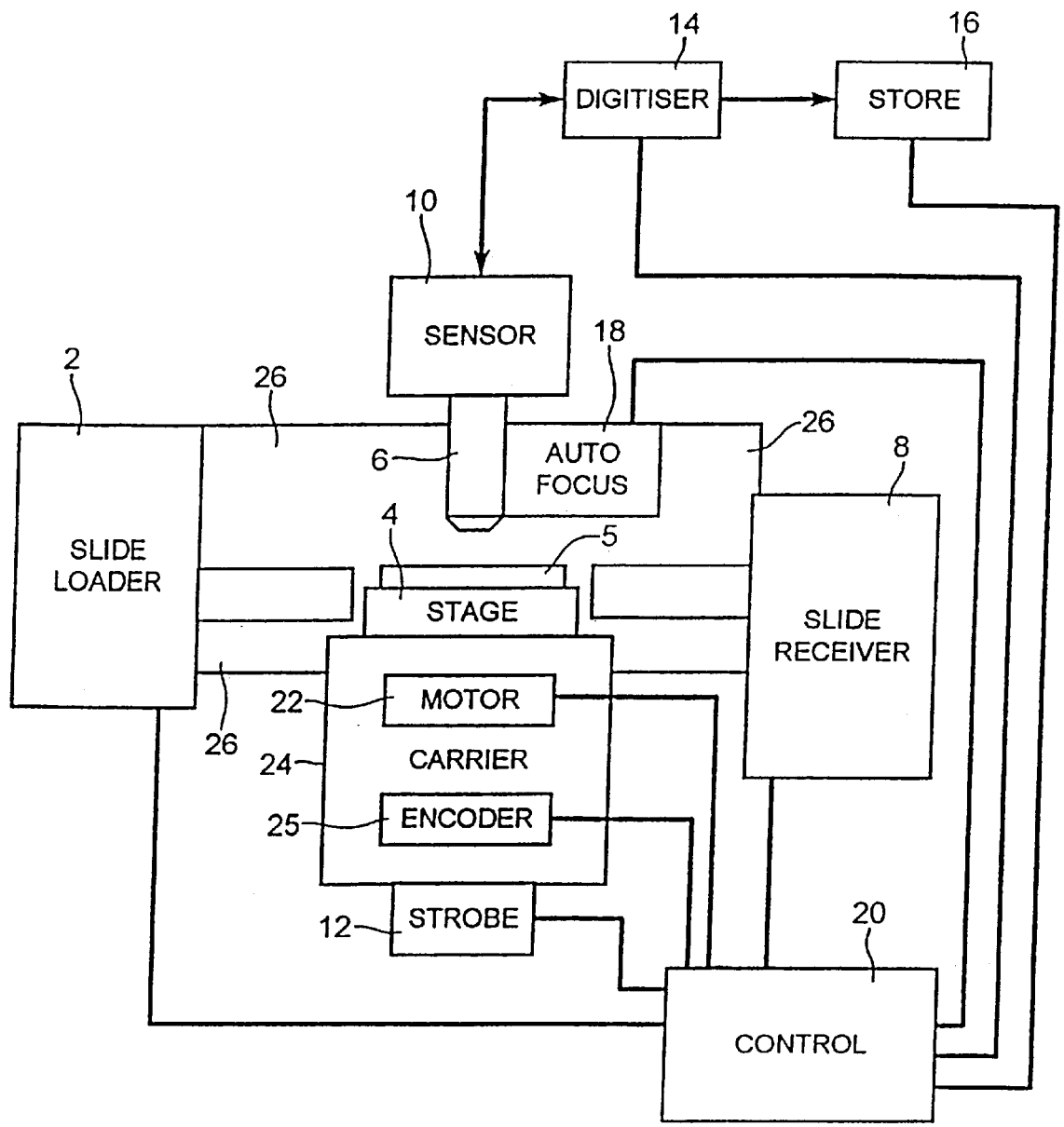
FIG. 1 is a schematic diagram of an automated microscopy system incorporating the slide scanning system of the present invention.

Referring to FIG. 1, there is shown diagrammatically a system for imaging a series of microscope slides, in which slides S are advanced from a slide loader 2, to a predetermined position on a stage 4 beneath a microscope optical system 6 on which they are secured by a vacuum chuck (see FIG. 3) during scanning, and from which they are discharged to a slide receiver 8.

The microscope optical system 6, when suitably focused, forms an image of a small area of the slide (much smaller than the total area of a sample carried by the slide and intersected by a optical axis of the system) on a sensor 10. Typically, the sensor 10 is a charge coupled device (CCD) array or other optical imaging array capable of providing a multiple pixel image of this small area which may be regarded as a sub-area of the sample area of the slide which latter area is assumed to be circular, which is increasingly the case with modern techniques of slide preparation. Depending upon the resolution of the spiral scan to be performed by the apparatus as described later, the sensor could be a single pixel device, but in order to obtain reasonably scanning speed and resolution, a multiple pixel device is preferred. Typically, a sub-area of the sample to be imaged is illuminated by a flash of light from a strobe lamp 12, having a duration short enough to "freeze" any scanning motion of the stage, in order to generate a charge image on the sensor array, the array being scanned during an interval prior to a further flash in order to recover image data which is passed to a digitiser 14 and thence to an image store 16.

Figure 4:
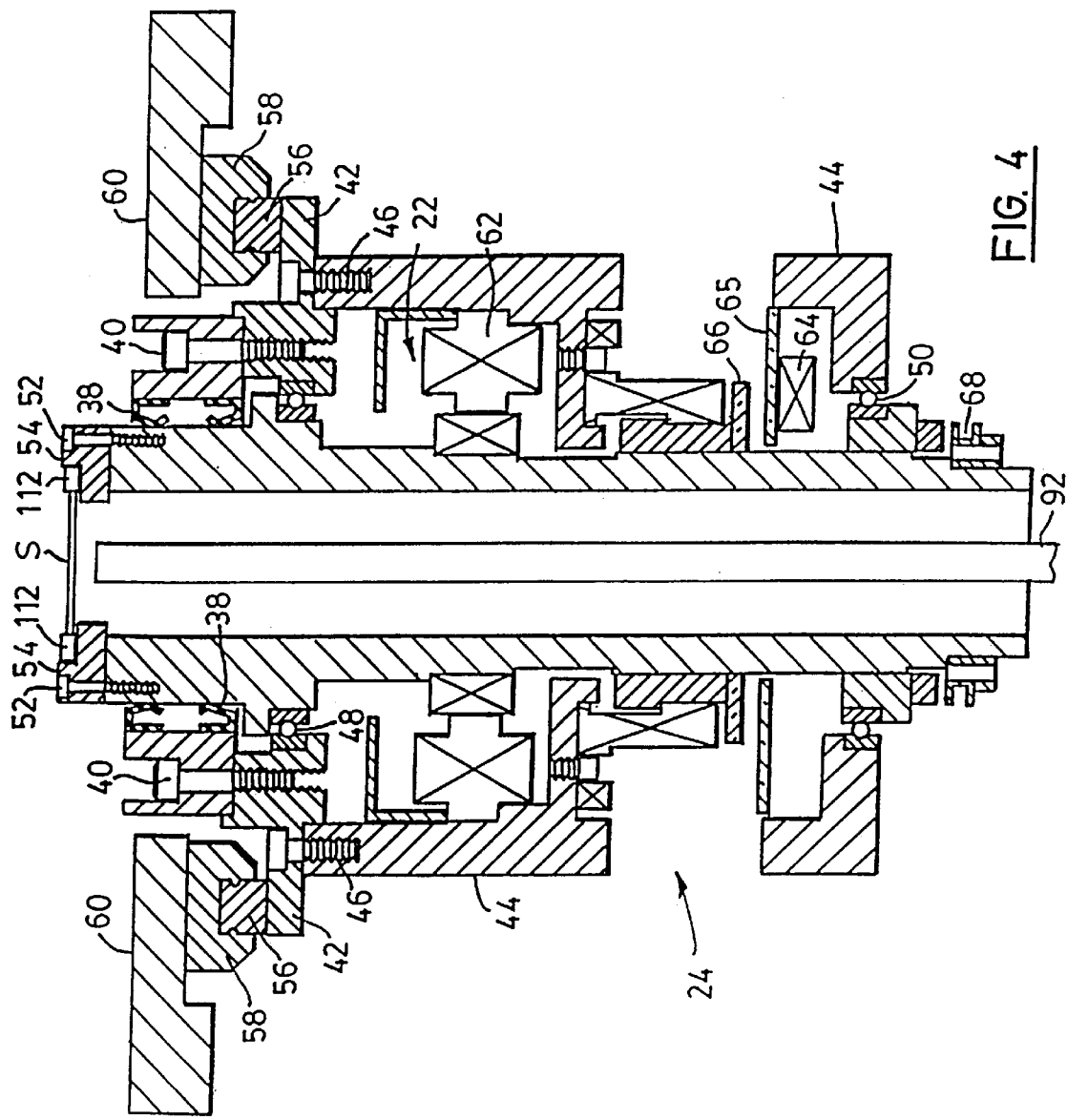
FIG. 4 is a vertical section through the scanner mechanism perpendicular to the line of advance of the slides.

Light from the strobe lamp may be conducted to adjacent the sample area of the slide S by a fibreoptic light pipe 92 as shown in FIG. 4. In practice, the optical system 6 may include beam splitters and filters, and the sensor 10 may include multiple photosensitive arrays receiving different spectral components of the image.

Appropriate array scanning, digitising and storage techniques are well known and need not be described in detail here.

Focusing of the optical system 6 is preferably by means of an automatic focus actuator 18. The focus actuator 18, the sensor control and digitiser 14, the store 16, and the strobe 12 are operated under control of signals from a control computer 20, which also controls a motor 22 which moves the stage 5, the assemblies 2 and 8 and the vacuum chuck as described further below, through a control program of conventional type providing appropriate sequencing of the operations described herein.

As described in more detail below, the stage 4 is supported on a tubular shaft, through which a slide supported thereon is illuminated, by a carrier 24 supporting the motor 22 and an encoder 26 which generates position signals applied to the control computer 20 to inform it of the progress of a scan. The carrier 24 is supported in a frame 26, which also supports the optical system 6, for linear movement in a defined direction, assumed for the purposes of description to be in the direction of slide movement through the system. This linear movement is directly related, by a mechanical drive as exemplified below, to rotation of the carrier 4 by the motor 22 so that, on operation of the motor when a slide S is secured to the carrier 4, the sample area of the slide will be moved relative to the optical axis of the optical system 6 such that this axis will follow a spiral scanning path over the sample area. Assuming for example that the sensor 10 is a CCD array receiving a magnified image of a 0.5 mm square area of the sample adjacent to the optical axis of the objective of system 6, and that the carrier 24 moves linearly 0.5 mm for each evolution of the stage 4, then 12 revolutions of the stage will result in a spiral scan of the entire surface of a 12 mm diameter sample area. If the lamp 12 is strobed 80 times per revolution, the images produced by the CCD will overlap slightly even at the outside of the sample, but with an increasing degree of overlap towards the centre. Assuming a raster scan of the CCD array with perpendicular scans which are respectively generally radial and generally tangential to the centre of the sample area, overlap can be reduced in the inner portion of the scan by increasing the intervals between strobes as the spiral scan moves inward towards the centre of the sample, assuming a constant motor speed, thus enabling a complete coverage of the sample area to be accumulated from the successive CCD scans. A scan of the sample area can thus be obtained with a resolution which is increased by a factor dependent on the size of the CCD array. For example, assuming a 512×512 pixel array, the resolution will be in the example considered be one micron. Selection of strobe intervals during progress of a spiral scan is readily computed or read from a table by the control computer 20 according to the data it receives from the encoder 26.

Figure 2:
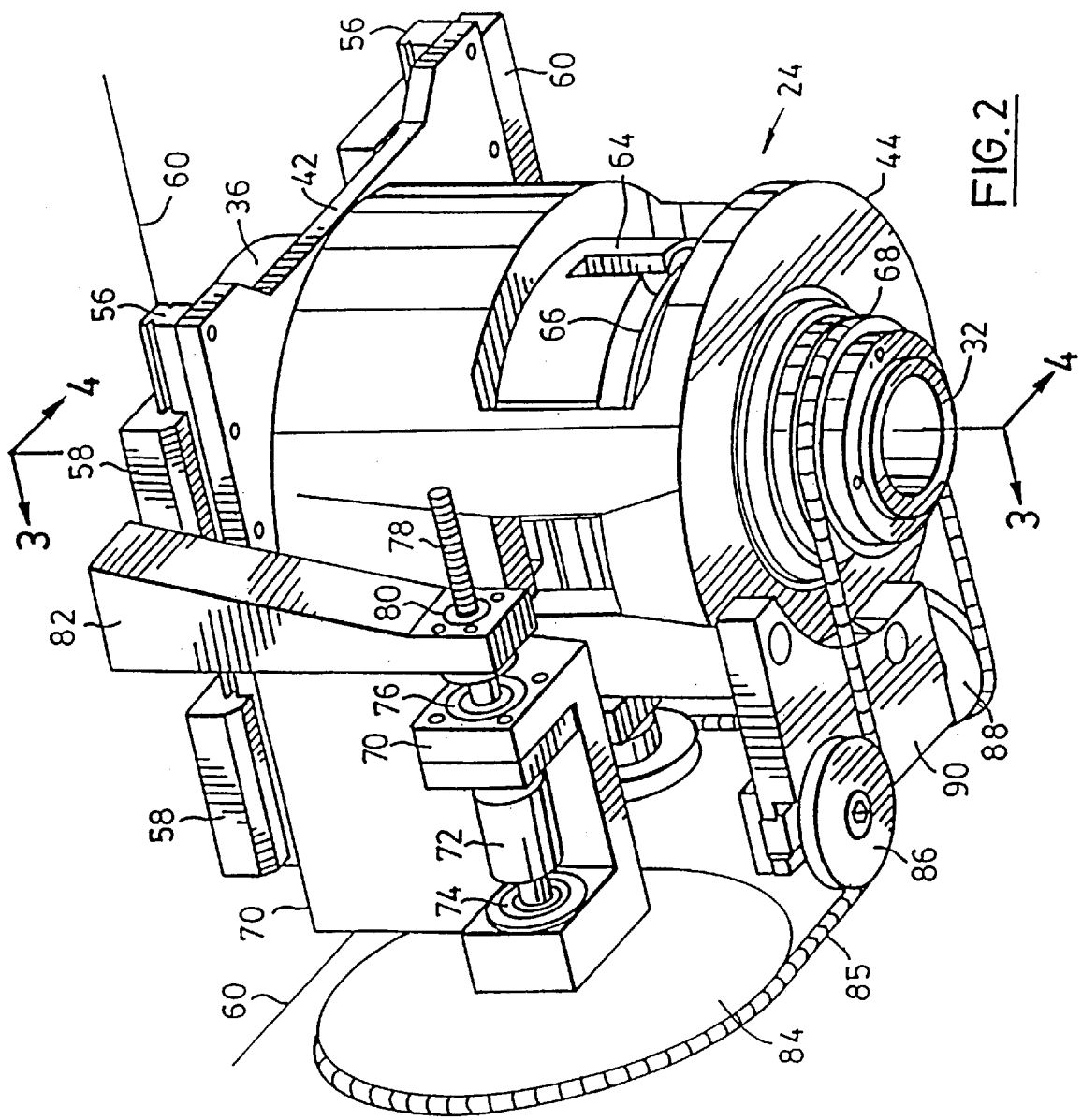
FIG. 2 is an isometric view from below and one side of a scanner mechanism incorporated in the system.
Figure 3:
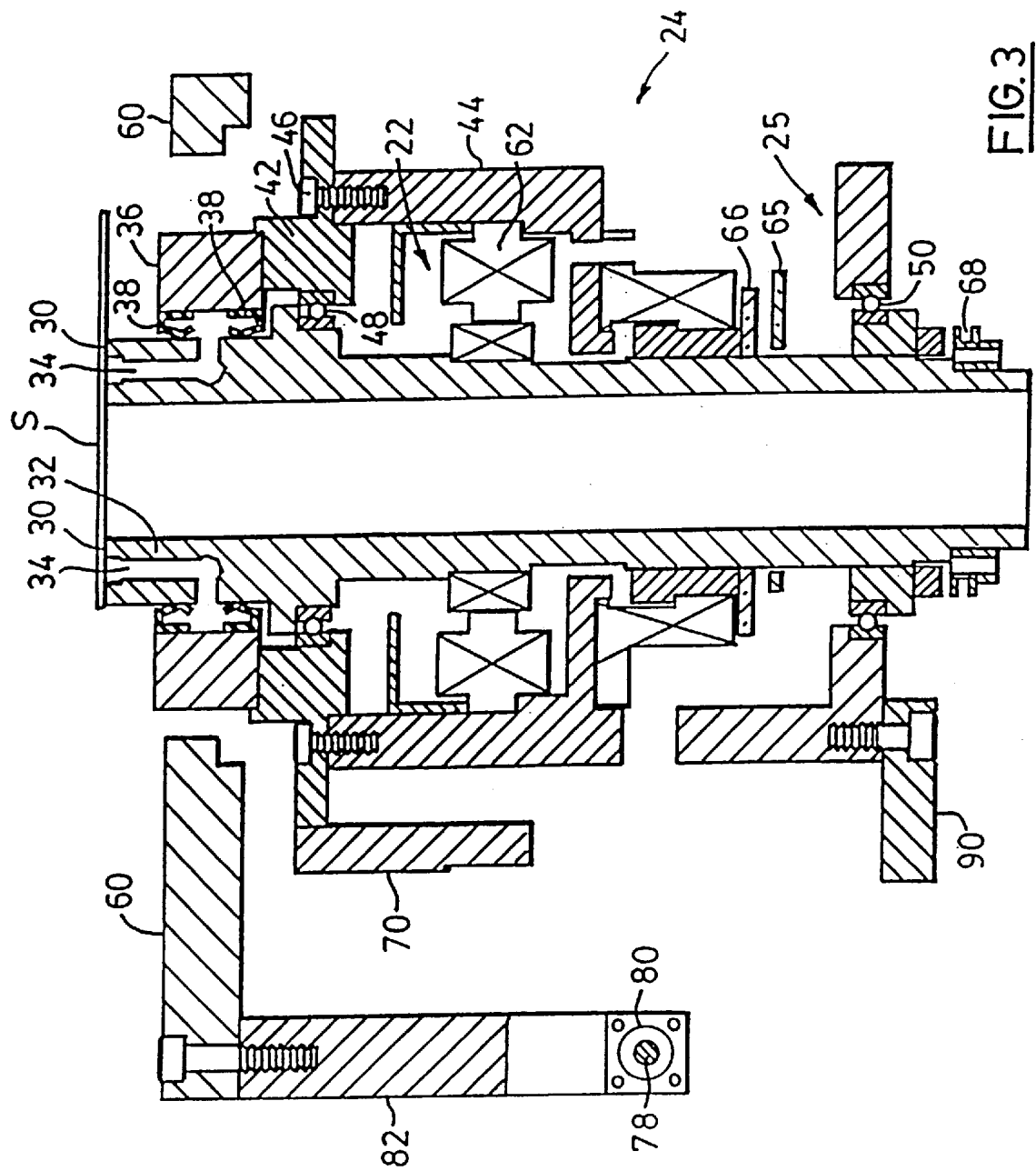
FIG. 3 is a vertical section through the scanner mechanism along a line of advance of the slides.

Referring now to FIGS. 2 to 4, the scanning mechanism incorporating the stage 4, the carrier 24 and the frame 26 will now be described in more detail.

The stage 4 comprises diametrically opposite top surface slide bearing areas 30 formed on an upper end of the tubular shaft 32, with vacuum chambers 34 opening into these areas to form the vacuum chuck which secures a slide during scanning. Vacuum is applied to the chamber 34, formed in the wall of the shaft 32, through a non-rotating vacuum manifold 36 surrounding the shaft and sealed thereto by rotary seals 38. The vacuum manifold is secured by screws 40 to a carrier plate 42 forming an upper wall of the carrier 24 which further comprises a housing 44 secured thereto by screws 46. The shaft 32 is supported in the carrier for rotating by roller bearings 48 and 50. Secured by screws 52 to the top of the shaft 32 to either side of the areas 30 are guides 54 which engage the longitudinal edges of side frames 112 of slide carriers 100 (see FIGS. 5A, 5B, 5C) as they are moved on an off the stage 4 to control lateral positioning of the slides.

The carrier 24 is supported in the frame for movement parallel to the direction of movement of slides across the stage by glides 56 attached to the carrier plate 42 and engaging complementary glides 58 secured to a plate 60 forming part of the frame 26.

Within the housing 44 is secured the stator 62 of the motor 22, the rotor 63 of the motor being secured to the shaft 32. Also within the housing is an optical shaft encoder, comprising a projector 64 and an optical pickup 65 secured to the housing, and a transparent encoder wheel 66 with index markings secured to the shaft 32.

Secured to the bottom of the shaft beneath the bearing 50 is a chain wheel 68, which drives a mechanism, shown in FIG. 2, which advances the carrier 24 relative to the plate 60 of the frame 26. A bracket 70 secured to the carrier plate 42 supports a spindle 72 in bearings 74 and 76 of which one at least is a thrust bearing restraining the spindle against longitudinal movement relative to the carrier while permitting rotational movement. A tail portion 78 of the spindle is provided with a precision screw thread engaging a nut 80 secured in a bracket 82 secured to the plate 60. The spindle is driven by a chain wheel 84 through a chain 85 engaging the chain wheel 68 and idler wheels 86 and 88 supported from the carrier by a bracket 90.

Figure 6:
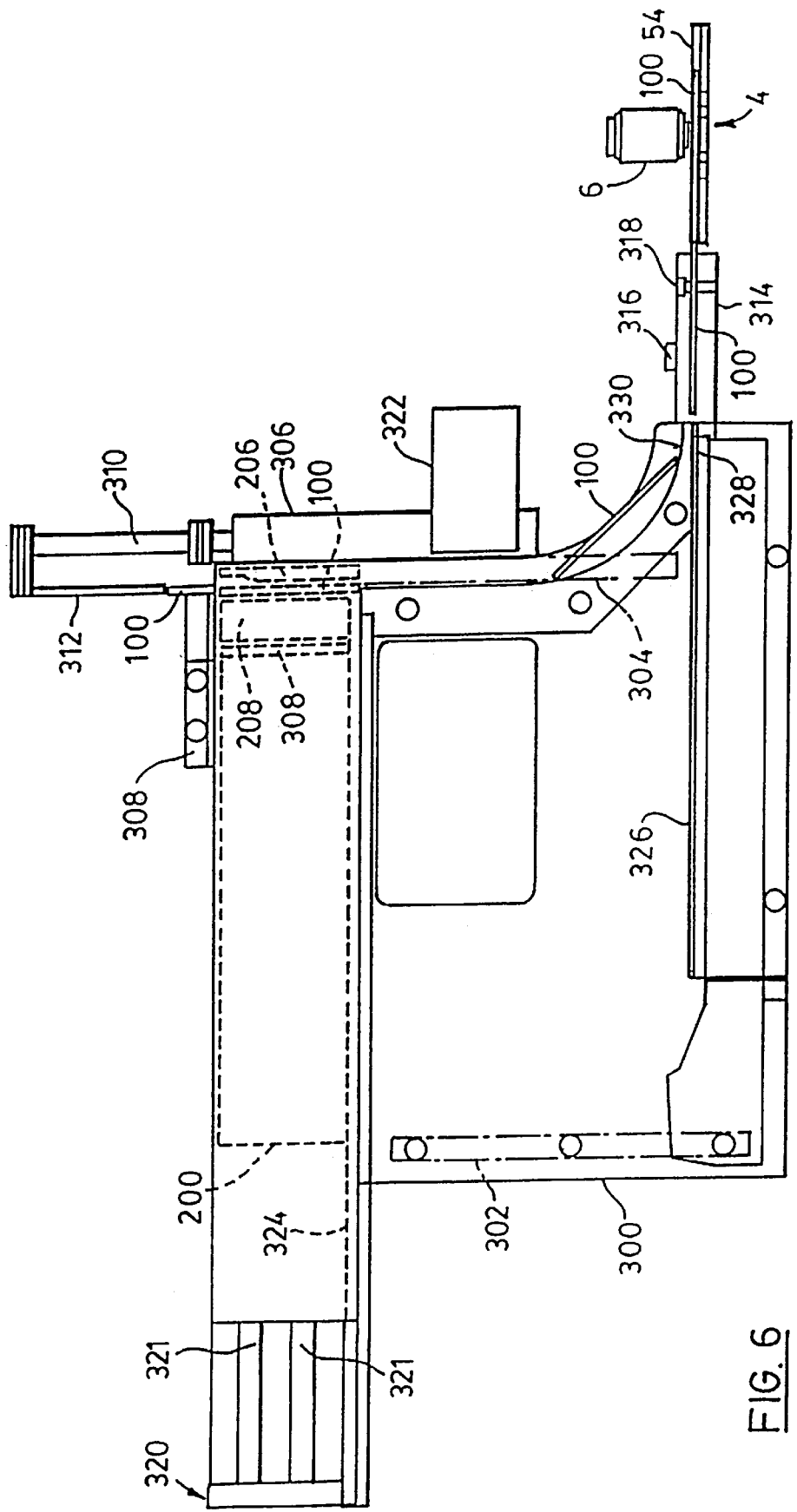
FIG. 6 is a side elevation of a slide loader.
Figure 7:
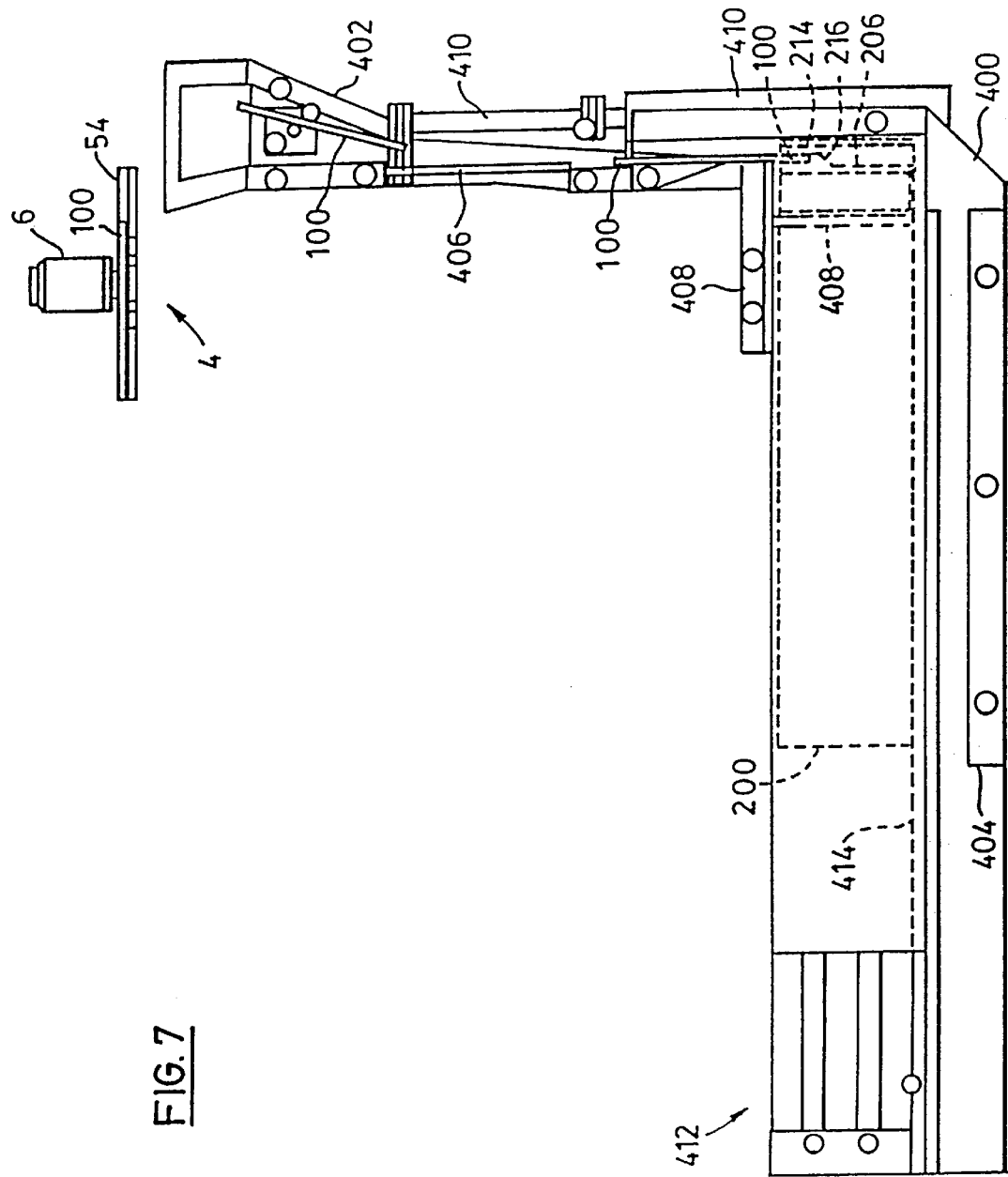
FIG. 7 is a side elevation of a slide receiver.
Figure 8:
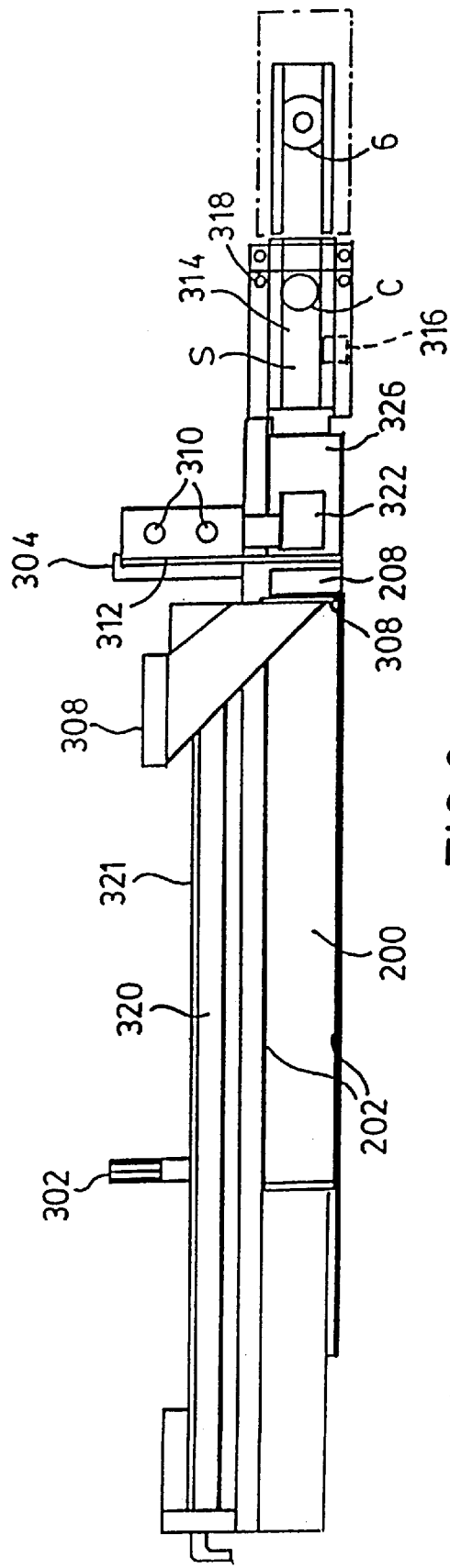
FIG. 8 is a plan view of the slide loader.

Preferred slide loader and receiver mechanisms are shown in more detail in FIGS. 6 to 8. Since these operate in conjunction with carriers accommodating individual slides, and cassettes for accommodating sets of slide carriers, these are described with reference to FIGS. 5A, 5B and 5C, and 9A and 9B respectively.

Referring to FIGS. 5A, 5B and 5C, a slide carrier 100 is moulded from synthetic resin, having dimensional stability and such as to provide the carrier with a limited degree of longitudinal flexibility, for example acrylonitrile butadiene-styrene copolymer (ABS). The carrier comprises a generally rectangular frame defining a rectangular aperture for receiving a rectangular microscope slide S on which a sample C (see FIG. 8) to be scanned has been prepared and protected by a cover glass. One end wall 102 of the carrier has a convex internal profile and is formed with a cutout 106 adjacent to the cutout so as to leave a convex arched resilient member 104 adjacent the slide receiving aperture, the convexity of which wall in its free state encroaches on the aperture for accommodating a slide. Other arrangements of members resiliently encroaching upon the slide space could be used. The opposite end wall 108 is provided with a tab 110 for engaging an upper surface of an end of a slide, while side walls 112 are provided with end tabs 114, 116 for engaging corners of a lower surface of the slide and intermediate tabs 118 for engaging longitudinal edges of the upper surface of the slide. To insert a slide into the carrier, the latter is flexed slightly longitudinally so that an end of the slide may be inserted from the top between the tabs 114 and 118 and pressed against the wall 10 to deflect the latter sufficiently so that the other end of the slide may be moved past the tab 110 to engage the tabs 116. The end walls 102 and 108 are recessed on these lower surfaces at 120, over a width and to a depth sufficient to clear the bearing areas 30 of the stage 4 as a slide carrier is moved over the stage, thus allowing the vacuum chambers 34 to act directly on the slide, while the side walls 112 of the carrier are guided by the guides 54. The walls of the carrier are provided with various indentations 122, 124 and 126 used for positioning the carrier and ensuring that a carrier which is oriented incorrectly (i.e., upside down or wrong way round) can be detected. A wall of the carrier, or the slide itself, may carry an identifying code, for example a bar code which can be used by a scanner such as a bar code or optical character reader.

Use of such slide carriers has the advantages of protecting the slides against breakage, providing greater safety in handling, reducing the risk of jamming during handling, and preventing contact between slides, which is desirable not only to prevent damage but to avoid the risk of slides becoming bonded together by mounting media used in the preparation of the slides.

Figure 9A:
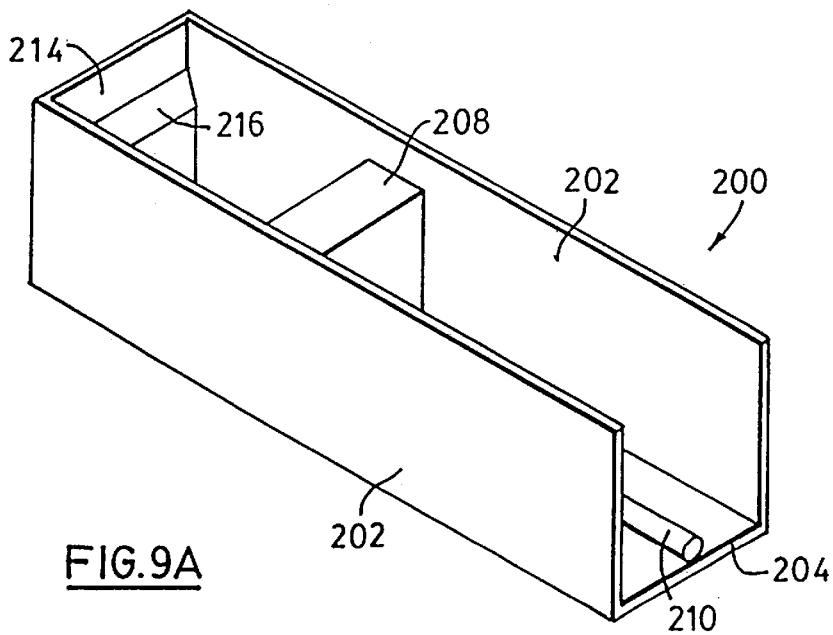
FIGS. 9A and 9B are isometric and side elevational views of a slide cassette.
Figure 9B:
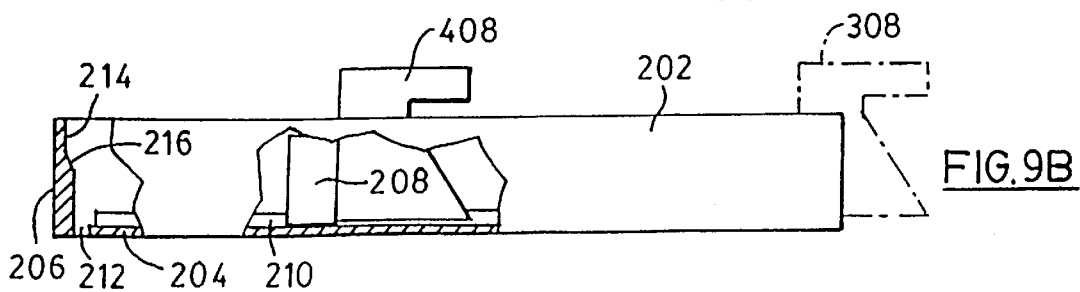

The slide carriers loaded with slides are stored in cassettes 200. A presently preferred embodiment of such a cassette is shown in FIGS. 9A and 9B. The cassette has longitudinal side walls 202, spaced to accommodate the width of a carrier 100, a bottom wall 204 and an end wall 206, the other end being open. A support block 208 is supported by a rail 210 on the bottom wall for movement longitudinally of the cassette. A slot 212 wide enough to pass a slide carrier 100 formed in the bottom wall 204 adjacent to the end wall 206 so that a slide carrier pressed flat against the end wall by the action of the block 208 may be pushed downwardly through the slot. The end wall 206 is formed with an internal recess 214 adjacent to its top edge with a ramped transition 216 to the remainder of the wall, so that an end of a carrier may be moved downwardly into the recess 214 and then pushed downwardly towards the slot 212 in front of slides pressed towards the end wall 206 by the block 208, under pressure from an external pusher member 308 or 408, which may be withdrawn (as shown in broken lines) through the open end of the cassette to allow the latter to be loaded or removed from the slide loader or receiver.

Referring now to FIGS. 6 and 8, the slide loader 2 comprises a subframe 300 mounted to the frame 26 by brackets 302, 304, and supporting a platform 324 for receiving a cassette 200 with its wall 206 towards the right as drawn. Push rods 321 of a pneumatic actuator 320 mounted on the subframe presses the pusher member 308 against the block 208 of the cassette, and may be actuated to withdraw the member 308 from the cassette to allow the latter to be placed on or removed from the platform 324. A pneumatic actuator 306 has piston rods 310 supporting a pusher member 312 which is driven downwardly on a retraction stroke of the actuator to drive a slide 100 (only one is shown in the cassette) located against the end wall 206 downwardly through the slot 212 (see FIG. 9B) whence it moves through successive positions past a scanner 322 such as a bar code reader or optical character reader adapted to read a code applied to the slide or its carrier, and around a curved chute 330 into a slide sensing station 314, in which sensors 316, 318 sense the presence of the slide and its orientation as indicated by the indentations 122 and 124.

Assuming that the stage 4 is positioned so that the guides 54 are aligned with the station 314, a slide located in the station 314 may be projected into the guides 54 by a servo controlled electrical actuator 326 which actuates a plunger 328 which projects the slide carrier out of the station 314 into the guides 54 under control of the sensors 316, 318 so as to advance the slide carrier to a known position in the guides 54, in which the slide itself may be temporarily secured to the stage 4 by the vacuum chambers 34 (see FIG. 3).

If a previous slide carrier is located in the guides 54, the incoming carrier projects the previous carrier out of the guides to the right into the slide receiver mechanism as shown in FIG. 7, whence it falls into a chute 402 supported by a sub-frame 400 of the receiver mechanism, mounted by a bracket 404 to the frame 26. It moves down the chute to a position beneath a pusher member 406 until its lower end enters the recess 214 at the end of a cassette 200. Thence a pneumatic actuator 410 may be actuated to move down the pusher member to press on the slide holder so that its lower end moves down the ramp 216 and displaces the block 208, and any slide holders already supported by the block, to the left as drawn, against pressure applied at the pusher member 408 by a pneumatic actuator 412 to a position allowing a cassette to be placed or removed on a platform 414.

In use of the apparatus, slides to be scanned are inserted into holders 100 as described, and the holders are loaded into a cassette with a common orientation and with the specimens facing towards the wall 206 of the cassette. The actuator 320 is operated to move the pusher 308 to its leftmost (as shown) position so that the loaded cassette may be placed on the platform 324. The actuator 412 is similarly operated to allow an empty cassette to be placed on the platform 414, after which the actuators are operated to place moderate pressure on the blocks 208 in each cassette through the pushers 308 and 408.

In order to initiate scanning, the actuator 306 is operated to retract its piston rods and cause the pusher member 312 to push a slide carrier downwards through and out of the slot 212 of the cassette on platform 324, such that the carrier, and the slide that it carries, moves past the scanner 322 to recover identifying information for storage with the image data to be recovered from the slide. The slide carrier 100 is directed by the chute 326 into the station 314. On sensing the arrival of a slide in the station, the actuator 316 is oriented to push the slide into the guides 54 of the stage 4, the carrier of which is in a home position at one end of its travel relative to the frame 26, with he guides aligned with those of the station 314. Any slide already on the stage will be displaced into the slide receiver mechanism 8 and stored in the cassette installed on the platform 414. The actuator 316 is operated so as to place the centre of a sample C on a slide in the carrier 100 on the optical axis of the optical system 6 (see FIG. 8).

The motor 22 is then started so as to rotate the stage 4 beneath the objective while advancing the carrier 24 to the right (as drawn) so that the axis of the objective follows a spiral path over the sample, while the encoder pickup generate a series of pulses tracking the motion along the spiral path. At intervals along the spiral path, as determined by counting of the encoder pulses, the motor is stopped, and a focus determining procedure is carried out using the focus actuator 18 to position the objective 6 and determine the optimum positioning of the optical system 6 relative to the stage 4 for optimum focus. Data as to the optimum position is stored, and the motor restarted. By this means, focus data for a series of positions distributed along the spiral path is collected. Typically, an initial autofocus operation will take place at the starting point, and then at decreasing angular intervals along the spiral path so as to obtain an approximately even distribution in terms of the area of the sample of points at which focus has been determined. The strobe lamp 12 will be flashed as necessary to provide the illumination of the sample required for autofocusing. Preferably the autofocus technique used is that disclosed in our International Patent Application filed concurrently and entitled "Autofocus System", but any alternative autofocusing system that provides adequate results may be utilized.

This preliminary scan may also be used to obtain other data such as image brightness data which can be utilized in the processing of data obtained during a subsequent scan.

When the spiral scan of the slide has been completed, as indicated by the count of encoder pulses reaching a predetermined total, the motor 22 is reversed to retrace the spiral scan in the opposite direction. During this reverse scan, the stored focus data is fed to the autofocus assembly 18 so as to maintain correct focus during the reverse scan without the delays associated with automatic focus determinations. This permits the motor to be run continuously. At intervals determined by the encoder pulse count, the strobe lamp 12 will be flashed to illuminate the sample and enable the optical sensor 10 to capture an image of the portion of the sample then adjacent the optical axis of the optical system 6. The duration of the flashes from the strobe lamp is short enough to "freeze" any motion of the sample due to the motor: a flash duration of about 2 microseconds is typical. The flashes are timed so that the images captured collectively provide complete overlapping coverage of the sample area, although excess overlap should be avoided since it involves storage of redundant data. This means that less frequent flashes will be required as the scan moves towards the centre of the sample, according to a sequence that can readily be calculated. Assuming that the sensor is a CCD or other array, the image data can readily be read and stored from the sensor between flashes, while the focus actuator 18 can be operated between flashes to adjust the focus of the objective according to the focus data stored during the initial scan.

It will be understood that sequencing of the above operation is readily controlled by a program stored in the controller 20; since the programming required to provide the sequencing and control function described is of a routine nature, it will not be described.

While a preferred embodiment of the invention has been described, numerous variations are possible within the scope of the invention as set forth in the appended claims. Thus alternative slide loading and receiving arrangements could be utilized in conjunction with the disclosed spiral scanner, and the disclosed slide loading and receiving system could be used in conjunction with other scanning systems. Imaging devices other than a conventional optical microscope could be utilized. While the scanning sequence utilized, with sequential scans in opposite directions to generate focus data and image data is believed advantageous, other scanning sequences could be used: for example, there could be a single focusing operation at the start of a data scan, or the motor 22 could be made unidirectional, if means were provided to disengage the lead screw at the end of a scan to release the carrier to return it to its starting position. If a stepping motor was employed, a separate encoder could be dispensed with. The direction of linear movement of the carrier can be in any direction, provided that it is perpendicular to the axis of rotation of the stage. The vacuum to hold down the slide on the stage could be applied axially through the hollow shaft 32 rather than through its walls, provided that appropriate windows permit the passage of illumination to the underside of the slide. The motor 22 and/or encoder 25 could be located elsewhere in the drive train of the scanning mechanism, although the position described is presently preferred since it minimizes inertia and backlash, or a stepping motor could be utilized with its control circuit providing the indexing signals. Rather than running the motor at a constant speed and varying the intervals between flashes of the strobe light 12, the motor speed could be varied and the intervals maintained constant. Rather than a strobe light, the sample could be continuously illuminated and the time and duration of image exposure controlled by a shutter or by electronic control of the optical sensor depending on the electronic characteristics of the latter. The various linear actuators disclosed may be either pneumatically or electrically operated.

We claim:

1. A method of preparing a digitised image of a sample carried by a microscope slide, comprising advancing a slide onto a stage to a predetermined location in which an optical axis of an imaging objective intersects the sample, and securing it at that location, imaging a sub-area adjacent a point of intersection of the optical axis and the sample on an optical sensor, moving the sample in a plane intersecting the optical axis so as to scan the sample and releasing said slide and removing it from the stage, characterized in that a circular area of the sample is scanned by rotating the stage about an axis perpendicular to the slide and centered in the circular area while conjointly moving the stage linearly along an axis parallel to a plane of the slide such that a point of intersection of the optical axis with the circular area moves along a spiral path extending between a centre of the circular area and a perimeter thereof, and in that a series of discreet multi-pixel images of overlapping sub-areas is captured on said optical sensor, image data output from the optical sensors being digitised for each of said images captured during said movement to provide a spiral scanned series of digital images of sub-areas collectively providing coverage of the circular area.

2. A method according to claim 1, characterized in that the stage is rotated and moved linearly by a common drive which generates an indexing signal controlling production of said digital images.

3. A method according to claim 2, characterized in that the optical sensor is an array producing a multiple pixel image of a sub-area imaged thereon, and the indexing signal controls a strobe light illuminating the sample to produce successive sub-area images thereon.

4. A method according to claim 1, characterized in that the stage is supported on a hollow shaft concentric with its axis of rotation in a carrier which is displaced in a frame along said linear axis by a screw rotationally linked to said shaft, and the circular area of the slide is illuminated through said hollow shaft.

5. A method according to claim 4, characterized in that a slide is secured in said predetermined location by vacuum applied to at least a chamber in a slide contacting surface of said stage by vacuum applied through said carrier.

6. A method according to claim 4, characterized in that the common drive is a motor acting between the carrier and the shaft, and the indexing signal is provided by using a shaft encoder detecting relative motion between said carrier and said shaft.

7. A method according to claim 1, wherein the imaging objective is associated with a focussing actuator, characterized in that, for each slide to be digitized, the stage is moved linearly along said axis twice, a series of focussing operations being performed during a spiral scan during a first pass along the axis to generate data used during a second pass to focus the objective while generating said series of digital images.

8. A method according to claim 7, wherein said passes are in opposite directions.

9. A method according to claim 8, wherein slides to be imaged are inserted in carriers and placed in a cassette, characterized in that successive carriers carrying slides to be imaged are projected by a first actuator out of a first cassette and down a first chute into a station adjacent the stage, a carrier in the station is projected by a second actuator onto the stage prior to scanning so as to project any carrier already on the stage off the stage into a second chute, and a third actuator projects a carrier in the second chute into a second cassette identical to the first cassette.

10. A method according to claim 9, characterized in that the first and third actuators act in parallel directions, and the second actuator acts in a direction perpendicular to the first and second actuators.

11. A method according to claim 9, characterized in that the cassettes are identical, and the carriers are projected into the second cassette in the same order and with the same orientation as they had in the first cassette.

12. Apparatus for automated production of digitised images of samples (C) carried by microscope slides (S), comprising an optical sensor (100, a stage (4) for supporting a slide carrying a sample, an optical system (6) for projecting on the sensor an image of a sub-area of a sample carried by a slide supported by the stage, means (2) for successively advancing slides onto said stage for imaging and means (98) for discharging them following imaging, means (34) for securing each slide on the stage during imaging, means for moving the stage in its own plane to scan the imaged sub-area on the sample through a scanning path, and means (14, 16) to digitize and store data representing images of sub-areas generated by the optical sensor during scanning of the sub-area sample through said scanning path, characterized in that the means for moving the stage comprises a carrier (24) supported for linear movement transverse to an optical axis of the optical system (6) intersecting the imaged point of the sample (C), a tubular support (32) for the stage journaled for rotation in the carrier, a common drive system (22, 68, 84, 78, 80) for the carrier and the tubular support including a motor (22) and the tubular support maintaining a predetermined relationship between rotational movement of the tubular support (32) and linear movement of the carrier (24), whereby operation of the motor causes the imaged sub-area on the sample to be scanned through a spiral scanning path, and means (12, 20) to effect the capture during scanning by the digitizing and storage means, (14, 16) of a series of discreet multi-pixel images of overlapping sub-areas of the sample.

13. Apparatus according to claim 12, characterized in that the capture means includes a strobe light (12) to illuminate a slide on the stage (4) through said tubular support (32).

14. Apparatus according to claim 12, characterized in that the drive system includes means (25) generating signals indexing progress of the imaged sub-area along the scanning path, and supplying these signals to means (20) controlling the capture of the discreet images.

15. Apparatus according to claim 12, characterized in that the motor (22) acts between the carrier (24) and the tubular shaft (32).

16. Apparatus according to claim 12, characterized in that the means generating indexing signals is an encoder (25) acting between the carrier (24) and the tubular shaft (32).

17. Apparatus according to claim 12, characterized in that the means for securing a slide on the carrier is vacuum chamber means (34) formed in a slide engaging surface (30) of the carrier, and vacuum to operate the vacuum chuck is applied to the stage through a rotary union (36, 38) between the carrier (24) and the tubular support (32).

18. Apparatus according to claim 12, characterized in that the optical sensor (10) is a sensor providing a multi-pixel area image.

19. Apparatus according to claim 18, characterized in that it includes a focus actuator (18) controlling the positioning of the optical system relative to the stage, and means (16) to store focus data as the position of the optical system (6) relative to the stage (4) and generated during a focussing operation for subsequent application to the actuator.

20. Apparatus according to claim 12, characterized in that the means for advancing slides onto said stage (4) comprises a cassette (200) containing slides mounted in carriers (100), means (324) supporting the cassette, means (312) for successively projecting carriers out of the cassette, a chute (330) receiving the carriers and directing them into a loading station (314), and an actuator (328) for projecting a carrier (100) onto said stage while ejecting therefrom any carrier already thereon.

21. Apparatus according to claim 20, characterized in that the means for receiving slides from the stage comprises a further chute (402) positioned to receive carrier (100) ejected from the stage (4), a second cassette (200) identical to the first cassette, means (414) receiving the second cassette beneath the further chute (402), and an actuator (406) for driving a carrier (100) from the chute into the cassette.

22. Apparatus according to claim 21, characterized in that the cassettes (200) and chutes (330, 402) are oriented such that a carrier from the first cassette is received by the second cassette in the same orientation as it had in the first cassette.

23. Apparatus for advancing microscope slides (S) through an automated scanning system from a slide loader (2) to a slide receiver (8) in which slides are successively located on a stage (4) for scanning, characterized in that the slide loader (2) comprises a cassette (200) containing slides mounted in carriers (100), means (324) supporting the cassette, means (312) for successively projecting carriers out of the cassette, a chute (330) receiving the carriers and directing them into a loading station (314), and an actuator (328) for projecting a carrier (100) onto said stage while ejecting therefrom any carrier already thereon; and in that the slide receiver comprises a further chute (402) positioned to receive a carrier (100) ejected from the stage (4), a second cassette (200) identical to the first cassette, means (414) supporting the second cassette beneath the further chute (402), and an actuator (406) for driving a carrier from the further a chute (402) into the cassette.

24. Apparatus according to claim 23, characterized in that the cassettes (200) and chutes (330, 402) are oriented such that a carrier from the first cassette is received by the second cassette in the same orientation as it had in the first cassette.

* * * * *